United States Patent
Liu

(10) Patent No.: US 7,376,112 B2
(45) Date of Patent: May 20, 2008

(54) METHOD AND SYSTEM FOR SEAMLESS SERVICE AVAILABILITY FOR MULTI-MODE TERMINALS IN DIFFERENT ACCESS NETWORKS

(75) Inventor: Huitao Liu, Round Rock, TX (US)

(73) Assignee: SBC Knowledge Ventures, L.P., Reno, NV (US)

( * ) Notice: Subject to any disclaimer, the term of this patent is extended or adjusted under 35 U.S.C. 154(b) by 463 days.

(21) Appl. No.: 11/011,498

(22) Filed: Dec. 14, 2004

(65) Prior Publication Data

US 2006/0126562 A1    Jun. 15, 2006

(51) Int. Cl.
  *H04Q 7/24* (2006.01)
  *H04M 3/42* (2006.01)
  *H04M 1/00* (2006.01)

(52) U.S. Cl. ............... 370/338; 455/417; 455/551; 455/552.1; 455/553.1

(58) Field of Classification Search ......... 455/417, 455/127.4, 551–553.1; 370/338
  See application file for complete search history.

(56) References Cited

U.S. PATENT DOCUMENTS

| | | | |
|---|---|---|---|
| 5,878,344 A | * | 3/1999 | Zicker .................. 455/426.1 |
| 6,091,948 A | * | 7/2000 | Carr et al. ............ 455/414.1 |
| 6,381,453 B1 | * | 4/2002 | Krishnan .............. 455/414.1 |
| 7,133,516 B2 | * | 11/2006 | Belkin et al. .......... 379/211.02 |
| 2004/0219948 A1 | * | 11/2004 | Jones et al. ........... 455/552.1 |
| 2005/0064855 A1 | * | 3/2005 | Russell ................ 455/417 |
| 2005/0075109 A1 | * | 4/2005 | Neyret et al. ........ 455/445 |
| 2005/0096024 A1 | * | 5/2005 | Bicker et al. ......... 455/417 |
| 2005/0186960 A1 | * | 8/2005 | Jiang .................... 455/435.1 |

FOREIGN PATENT DOCUMENTS

EP    700227 A2 *    3/1996

* cited by examiner

*Primary Examiner*—William Trost
*Assistant Examiner*—Marivelisse Santiago-Cordero
(74) *Attorney, Agent, or Firm*—Toler Law Group, Intellectual Properties

(57) ABSTRACT

Systems, methods and devices provide seamless communication service for a wireless multi-mode communication terminal. A multi-mode communication terminal with an intelligent call forwarding module automatically forwards calls in a multi-mode network environment. A backbone communication network links at least two modes of the multi-mode environment.

15 Claims, 2 Drawing Sheets

METHOD AND SYSTEM FOR SEAMLESS SERVICE AVAILABILITY FOR MULTI-MODE TERMINALS IN DIFFERENT ACCESS NETWORKS

FIELD OF THE INVENTION

The present invention relates to telecommunications and in particular to methods and systems to provide seamless communications service availability for multi-mode terminals over different access networks.

BACKGROUND OF THE INVENTION

Wireless Local Area Network (WLAN) offers wireless broadband service, including VoIP and other data services, in a small area with limited mobility. WLAN, especially in terms of Wi-Fi (802.11a/b/g), is been widely deployed in many places. Wireless Wide Area Network (WWAN) offers voice and/or data services over a large geographical area with true mobility. Some device manufacturers are developing or have developed multi-mode terminal devices that are able to work in WLAN and WWAN.

However, the multi-mode devices typically cannot or do not operate in multiple modes (both WLAN and WWAN) simultaneously due to technical difficulties, cost, battery drain, and so forth. For example, if the terminal is working in WLAN mode, then the WWAN circuit may be shut down which makes the terminal unavailable in WWAN.

In addition, typical multi-mode terminal devices have unique directory numbers in different access networks. For example, a terminal may have a directory number in the corporate environment (for example, PBX or PABX) and a directory number in the WWAN network. The problem of ensuring that a call to the terminal's number in an access network reaches the terminal that is currently in a different access network requires a solution.

Current solutions in the industry focus on new functional nodes and signaling protocols in the network to handle the call routing based on the presence of the mobile terminal. This approach requires new network nodes and protocols to be implemented by the network service providers in the current networks, which can be costly, technically difficult, and problematically places the burden of the solution on the service provider.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which.

DETAILED DESCRIPTION OF THE INVENTION

Figure 1:
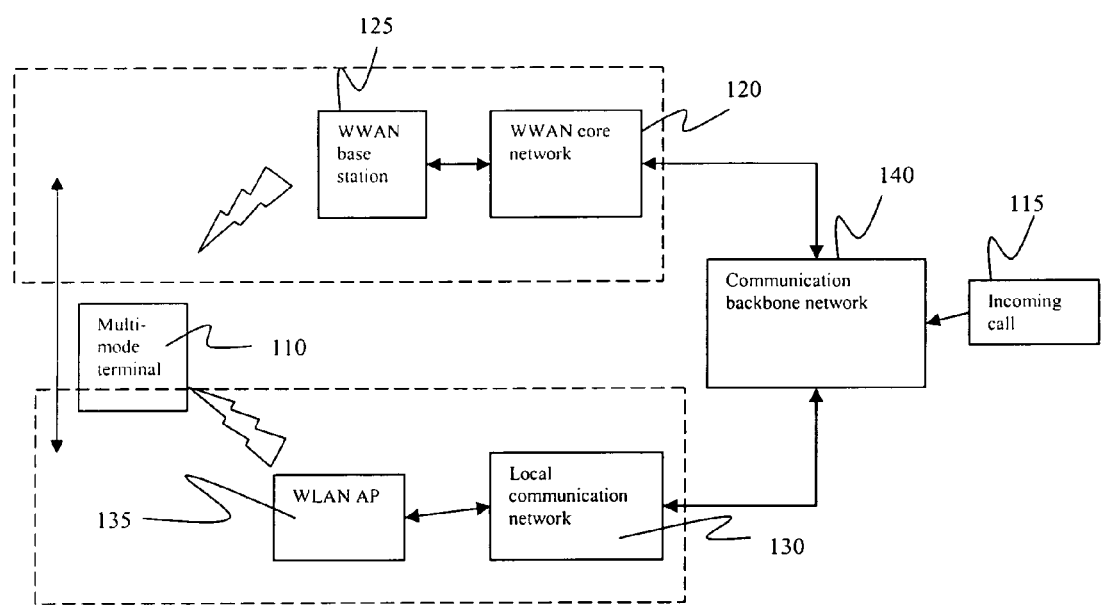
FIG. 1 is a schematic block diagram of a system of one embodiment of the present invention.

In view of the foregoing, the present invention, through one or more of its various aspects, embodiments and/or specific features or sub-components, is thus intended to bring out one or more of the advantages that will be evident from the description. The present invention is described with frequent reference to telephones or cell phones. It is understood that a phone is merely an example of a specific embodiment of the present invention, which is directed generically to mobile communication terminals, equipment, systems and methods within the scope of the invention, together with attendant networks such as Public Switched Telephone Networks (PSTN) and Internet Protocol (IP) telephony, including but not limited to Voice-Over IP (VoIP). The terminology, therefore, is not intended to limit the scope of the invention.

Definitions:

Wireless Local Area Network (WLAN): a wireless network that offers wireless communication and covers a small geographical area, typically less than 100 meters in diameter. WLAN includes Wi-Fi (802.11a/b/g), HiperLAN (an alternative, European, WLAN standard to the American IEEE 802.11 standards), and the like.

Wireless Wide Area Network (WWAN): a wireless network that offers wireless communication and covers a large geographical area, typically a few miles. WWAN includes 2G and 3G wireless networks (GSM, IS-136, IS-95, UMTS, CDMA1x, etc), WiMax, 802.16, and the like.

Wireless multi-mode device: terminal device that is capable of access and work in both WLAN and WWAN networks.

Intelligent Call Forwarding Module (ICFM): a functional module which can be either a software or hardware implementation that resides in the wireless multi-mode device. When a triggering event happens (for example access network change), the ICFM automatically or manually (by user interaction) enables the call forwarding feature in the previous access network to the directory number in the current access network and disables other call forwarding settings that may conflict with the new call forwarding action. The module also logs the events (access network and call forwarding status) in the device's memory for later use.

Call forwarding (or call diverting), in telephony, is a feature on some telephone networks that allows an incoming call to a called party which would be otherwise unavailable to be redirected to a mobile telephone or other telephone number where the desired called party is situated. Typically, special types of call forwarding can be activated only if the line is busy, or if there is no answer, or even only for calls from selected numbers. In North America, the North American Numbering Plan (NANP) presently uses the following vertical service codes to control call forwarding:

forward all calls: *72 activation; *73 deactivation on busy or no answer;
activation from select callers: *68, *88, deactivation;
activation on ISDN: *63, *83, deactivation;
change forward-to number: *56.

Customer-programmable features are also available through some network providers:

busy line: *90, activation, *91, deactivation;
change number: *40;
no answer: *92, activation; *93, deactivation;
change number: *42.

The present invention is a combination of algorithms, software and hardware implementation to provide the service availability for multi-mode terminal devices that are capable of communications over Wireless LAN and Wireless WAN. The basic idea is to use a modified call forwarding feature in the networks to forward calls placed to the terminal directory number in other access networks to the directory number in its current serving network.

That is, rather than call forwarding between two different terminals, call forwarding of the present invention forwards a call to a selected multi-mode terminal in a first network mode to the same terminal in a second network mode. Forwarding to the same terminal is facilitated by exploiting the distinct assigned terminal phone number for each network environment in which the terminal can operate.

FIG. 1 is a schematic block diagram of a system of one embodiment of the present invention. The components of the system include multi-mode terminal 110, which is able to receive incoming call 115 whether multi-mode terminal 110 is located in WWAN core network 120, with base station 125, or local communication network 130, such as enterprise PBX, with AP 135.

WWAN 120 and local communication network 130 are linked by communication backbone network 140. Accordingly, incoming call 115 to the WWAN network 120 phone number can be forwarded to multi-mode terminal 110 in the local network through backbone network 140.

Multi-mode terminal 110 is always able to receive calls no matter to which directory number (of the multi-mode terminal 110) originating call 115 was targeted. An advantage of the invention is that no new network nodes and protocols are needed from the network service provider and the solution only needs to be implemented in the multi-mode terminals.

Figure 2:
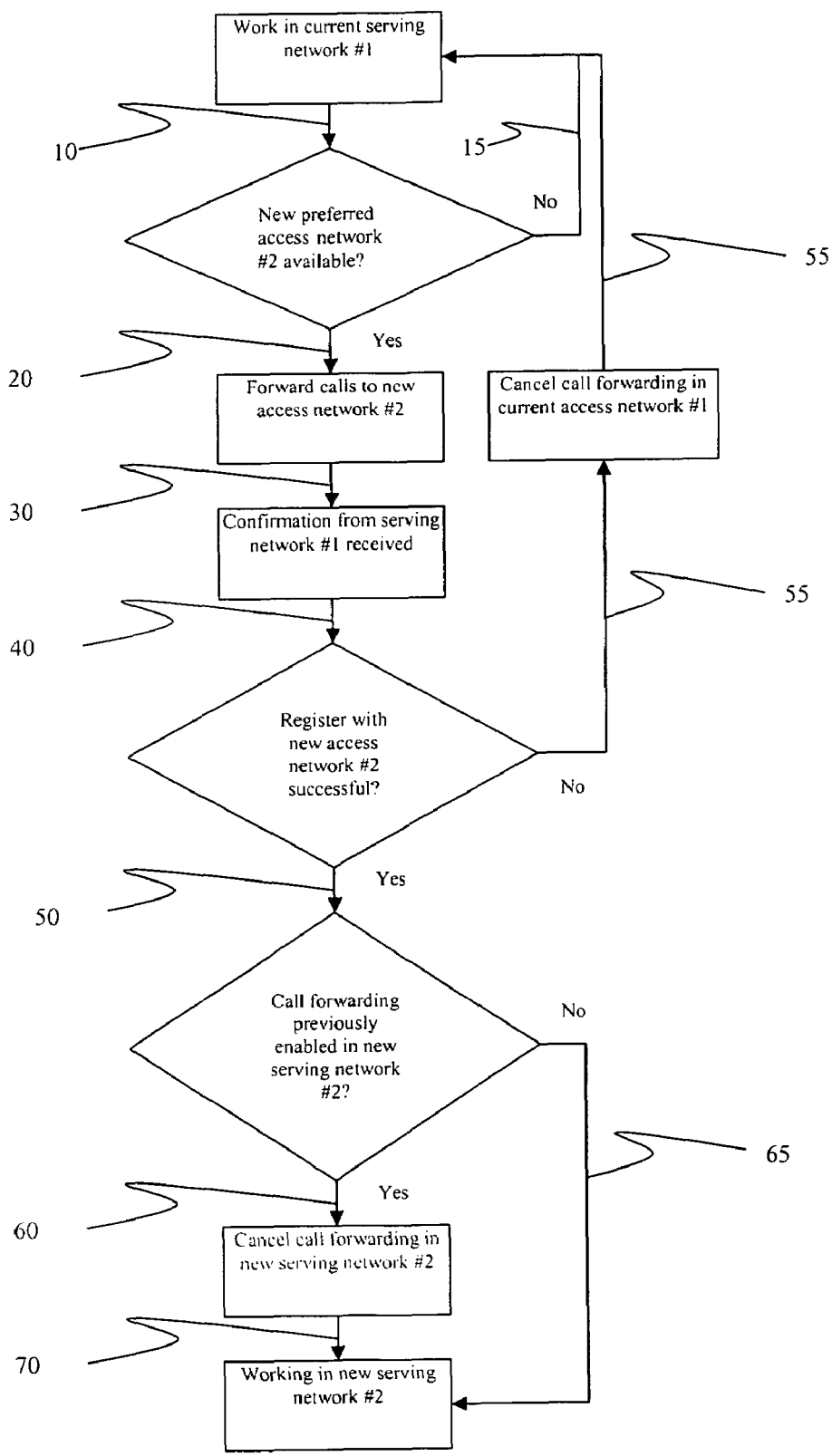
FIG. 2 is a logic flow chart of one embodiment of the present invention.

FIG. 2 is a logic flow chart of one embodiment of the present invention. Multi-mode terminal 110 working in a first network (#1) 10 determines that a new preferred access network #2 is available (WLAN or WWAN, for example) 20, the Intelligent Call Forwarding Module instructs the multi-mode terminal 110 to first send out signaling message in the current serving network #1 to forward all incoming calls to the directory number of multi-mode terminal 110 in the new access network (#2) 30. Otherwise, terminal 110 continues to operate in network (#1) 15.

The module then logs that the call forwarding is enabled in network #1. The information is stored in its internal log. Upon the confirmation 40 from the current network #1, the intelligent call forwarding module, multi-mode terminal 110 registers 50 in the new wireless access network #2. If registration is not successful, terminal 110 cancels 55 call forwarding in network #1.

After the successful registration in the new wireless network #2, the Intelligent Call Forwarding Module checks its internal log to see if call forwarding has been previously enabled in the new serving network (#2) 60. If so, the Module instructs the multi-mode terminal to send out a signaling message to disable call forwarding settings in the new serving network (#2) 70.

If the registration with the new wireless network #2 is not successful, the Module instructs the multi-mode terminal to cancel the call forwarding it had just enabled in the serving network #1 and the multi-mode terminal continues to work in current mode 65.

For example: Assume multi-mode terminal 110 is GSM and WiFi ready. The terminal has one number X in GSM network and one number Y in the corporate PBX or PABX (with WiFi as access network) at the office.

The multi-mode terminal with number X is registered in the GSM network. The multi-mode terminal has network detection hardware and software, and discovers that a preferred WiFi (802.11a/b/g) network connected to a corporate PABX, which supports the service (e.g., voice or data) offered in WWAN, is available.

The multi-mode terminal enables call forwarding in GSM network to forward calls to the number Y. In a specific embodiment, forwarding is enabled by a supplementary services command (e.g., **21*Y#) or other signaling commands supported by the network. When the Home Location Register (HLR) in the GSM network receives the command, the GSM core network forwards incoming calls with destination X to number Y through the communication backbone network. After the call forwarding is enabled, the multi-mode terminal registers with the PBX via the WiFi access network.

The multi-mode terminal queries the PBX or checks its internal memory to discover any previous call forwarding set up (to number X in the GSM network, for example). The terminal disables the call forwarding in the PBX by sending commands (that are supported by the PBX for call forwarding) over the WiFi access network. The terminal now receives calls dialed to number Y. Calls that are dialed to number X will be forwarded to number Y. Therefore, from the calling party's view, the multi-mode terminal is also available as number X.

When the terminal leaves the WiFi network (corporate PBX), the ICFM performs the call forwarding procedure again so that it is now available as number X and calls to the PBX number Y are forwarded to number X.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

I claim:

1. A multi-mode communications terminal having access to a first communication network via a first directory number and configured to gain seamless access to a second communication network via s second directory number, the multi-mode communications terminal comprising:
   an intelligent call forwarding module to:
   automatically enable call forwarding of calls directed to the first directory number of the first communication network to the second directory number of the second communication network before a change of access from the first communication network to the second communication network; and
   automatically disable call forwarding of calls directed to the second directory number of the second communication network conflicting with the enabled call forwarding of calls directed to the first directory number of the first communication network after the change of access from the first communication network to the second communication network.

2. The terminal of claim 1, wherein the first communication network comprises a wireless wide area network or a wireless local area network.

3. The terminal of claim 1, wherein the second communication network comprises a wireless local area network or a wireless wide area network.

4. The terminal of claim 1, wherein the first communication network or the second communication network comprises a private branch exchange.

5. The terminal of claim 1, wherein the first communication network or the second communication network comprises a private automatic branch exchange.

6. The terminal of claim 1, wherein the first communication network and the second communication network are linked by a backbone network.

7. The terminal of claim 1, wherein the intelligent call forwarding module is located within a cellular phone.

8. A method of providing seamless access to a multi-mode communication terminal across a plurality of communication networks, the method comprising:
providing the multi-mode communication terminal access to a first communication network via a first directory number;
detecting availability to the multi-mode communication terminal of a second communication network via a second directory number;
automatically enabling call forwarding of calls directed to the first directory number of the first communication network to the second directory number of the second communication network before a change of access from the first communication network to the second communication network;
changing access of the multi-mode communication terminal from the first communication network to the second communication network; and
automatically disabling call forwarding of calls directed to the second directory number of the second communication network conflicting with the enabled call forwarding of calls directed to the first directory number of the first communication network after the change of access from the first communication network to the second communication network.

9. The method of claim 8, wherein changing access comprises registering the multi-mode communication terminal with the second communication network.

10. The method of claim 8, further comprising determining whether call forwarding was previously enabled to the second directory number of the second communication network from the first directory number of the first communication network.

11. The method of claim 8, wherein the multi-mode communication terminal comprises a cellular phone.

12. The method of claim 8, wherein the plurality of communication networks comprises a wireless wide area network.

13. The method of claim 8, wherein the plurality of communication networks comprises a wireless local area network.

14. The method of claim 8, wherein the plurality of communication networks comprises a global system for mobile communications network.

15. A system to provide seamless access for a wireless multi-mode communications terminal, the system comprising a multi-mode network environment comprising a first communication network providing access to the multi-mode communication terminal via a first directory number and a second communication network configured to provide access to the multi-mode communication terminal via a second directory number, the multi-mode network responsive to:
a first message received from the multi-mode communication terminal to automatically enable call forwarding of calls directed to the first directory number of the first communication network to the second directory number of the second communication network before the multi-mode terminal changes access from the first communication network to the second communication network; and
a second message received from the multi-mode communication terminal to automatically disable call forwarding of calls directed to the second directory number of the second communication network conflicting with the enabled call forwarding of calls directed to the first directory number of the first communication network after the multi-mode terminal changes access from the first communication network to the second communication network.

\* \* \* \* \*